United States Patent
Chang et al.

(10) Patent No.: US 12,238,414 B2
(45) Date of Patent: Feb. 25, 2025

(54) IMAGE SENSOR, MOBILE DEVICE, AND IMAGE SENSOR OPERATION METHOD FOR REDUCING DATA TRANSMISSION LATENCY

(71) Applicant: Samsung Electronics Co., Ltd., Suwon-si (KR)

(72) Inventors: Semin Chang, Suwon-si (KR); Seongwook Song, Suwon-si (KR); Curie Kim, Suwon-si (KR); Jeongho Park, Suwon-si (KR); Chunghwan Park, Suwon-si (KR); Myunghyun Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 125 days.

(21) Appl. No.: 18/198,859

(22) Filed: May 18, 2023

(65) Prior Publication Data
US 2024/0098387 A1     Mar. 21, 2024

(30) Foreign Application Priority Data
Sep. 21, 2022   (KR) ........................ 10-2022-0119537

(51) Int. Cl.
*H04N 23/65* (2023.01)
*H04N 23/60* (2023.01)

(52) U.S. Cl.
CPC ......... *H04N 23/651* (2023.01); *H04N 23/665* (2023.01)

(58) Field of Classification Search
None
See application file for complete search history.

(56) References Cited

U.S. PATENT DOCUMENTS

| | | | |
|---|---|---|---|
| 5,819,058 A * | 10/1998 | Miller | G06F 9/3885 |
| | | | 712/210 |
| 6,028,445 A | 2/2000 | Lawman | |
| 6,507,943 B1 | 1/2003 | Kelem | |
| 6,563,437 B1 | 5/2003 | Landry et al. | |
| 6,633,969 B1 * | 10/2003 | Lin | G06F 9/30149 |
| | | | 712/213 |
| 2004/0059892 A1 * | 3/2004 | Paolucci | G06F 9/30178 |
| | | | 712/E9.037 |
| 2016/0320972 A1 * | 11/2016 | Chhabra | G06F 3/0608 |
| 2023/0107692 A1 * | 4/2023 | Li | H04N 23/90 |
| | | | 348/211.1 |

FOREIGN PATENT DOCUMENTS

| | | | | |
|---|---|---|---|---|
| CN | 104216682 A | * | 12/2014 | ............... G06F 9/26 |
| JP | H08149091 A | | 6/1996 | |
| JP | H08263433 A | | 10/1996 | |
| JP | 2001358731 A | | 12/2001 | |
| JP | 2004336366 A | | 11/2004 | |

* cited by examiner

*Primary Examiner* — Paul M Berardesca
(74) *Attorney, Agent, or Firm* — Myers Bigel, P.A.

(57) ABSTRACT

An image sensor, a mobile device, and an image sensor operation method for reducing a data transmission latency are disclosed. The image sensor includes an interface circuit configured to receive compressed data from an external processor, at least one memory configured to store the compressed data, and a control logic circuit configured to decompress the compressed data based on an initialized first clock rate, wherein, after the control logic circuit decompresses the compressed data, the first clock rate is reset to a second clock rate.

20 Claims, 17 Drawing Sheets

IMAGE SENSOR, MOBILE DEVICE, AND IMAGE SENSOR OPERATION METHOD FOR REDUCING DATA TRANSMISSION LATENCY

CROSS-REFERENCE TO RELATED APPLICATION

This application is based on and claims priority under 35 U.S.C. § 119 to Korean Patent Application No. 10-2022-0119537, filed on Sep. 21, 2022, in the Korean Intellectual Property Office, the disclosure of which is incorporated by reference herein in its entirety.

BACKGROUND

The inventive concept relates to an image sensor, and more particularly, to an image sensor, a mobile device, and an image sensor operation method for receiving compressed data to reduce a data transmission latency.

An image sensor captures a two-dimensional or three-dimensional image of an object. The image sensor generates the image of the object by using a photoelectric conversion element reacting according to the intensity of light reflected from the object. Recently, along with the development of complementary metal-oxide semiconductor (CMOS) technology, CMOS image sensors using a CMOS have been widely used.

SUMMARY

The inventive concept provides an image sensor, a mobile device, and an image sensor operation method for receiving compressed configuration data and decompressing the received compressed configuration data in the image sensor to reduce a data transmission latency and a memory use amount.

According to aspects of the inventive concept, there is provided an image sensor including an interface circuit configured to receive compressed data from an external processor, at least one memory configured to store the compressed data, and a control logic circuit configured to decompress the compressed data based on an initialized first clock rate, wherein, after the control logic circuit decompresses the compressed data, the first clock rate is reset to a second clock rate.

According to aspects of the inventive concept, there is provided an operation method of an image sensor, the method including initializing a clock rate of a control logic circuit to a first clock rate, receiving compressed configuration data, decompressing the compressed configuration data, and resetting the first clock rate of the control logic circuit to a second clock rate after decompressing the compressed configuration data.

According to aspects of the inventive concept, there is provided a mobile device including a processor configured to receive compressed configuration data, and an image sensor that includes a control logic circuit configured to receive the compressed configuration data from the processor and configured to decompress the compressed configuration data based on a first clock initialized at a first clock rate, wherein, after the control logic circuit decompresses the compressed configuration data, the first clock rate of the first clock is reset to a second clock rate.

BRIEF DESCRIPTION OF THE DRAWINGS

Embodiments of the inventive concept will be more clearly understood from the following detailed description taken in conjunction with the accompanying drawings in which.

DETAILED DESCRIPTION

When a processor in a mobile device transmits configuration data to an image sensor, low-speed communication, such as inter-integrated circuit (I2C) communication or serial peripheral interface (SPI) communication, of 10 Mbps or lower may be used, and as the size of configuration data increases, a data transmission latency may increase. Accordingly, there is a need for an image sensor and an image sensor operation method for reducing a data transmission latency.

Figure 1:
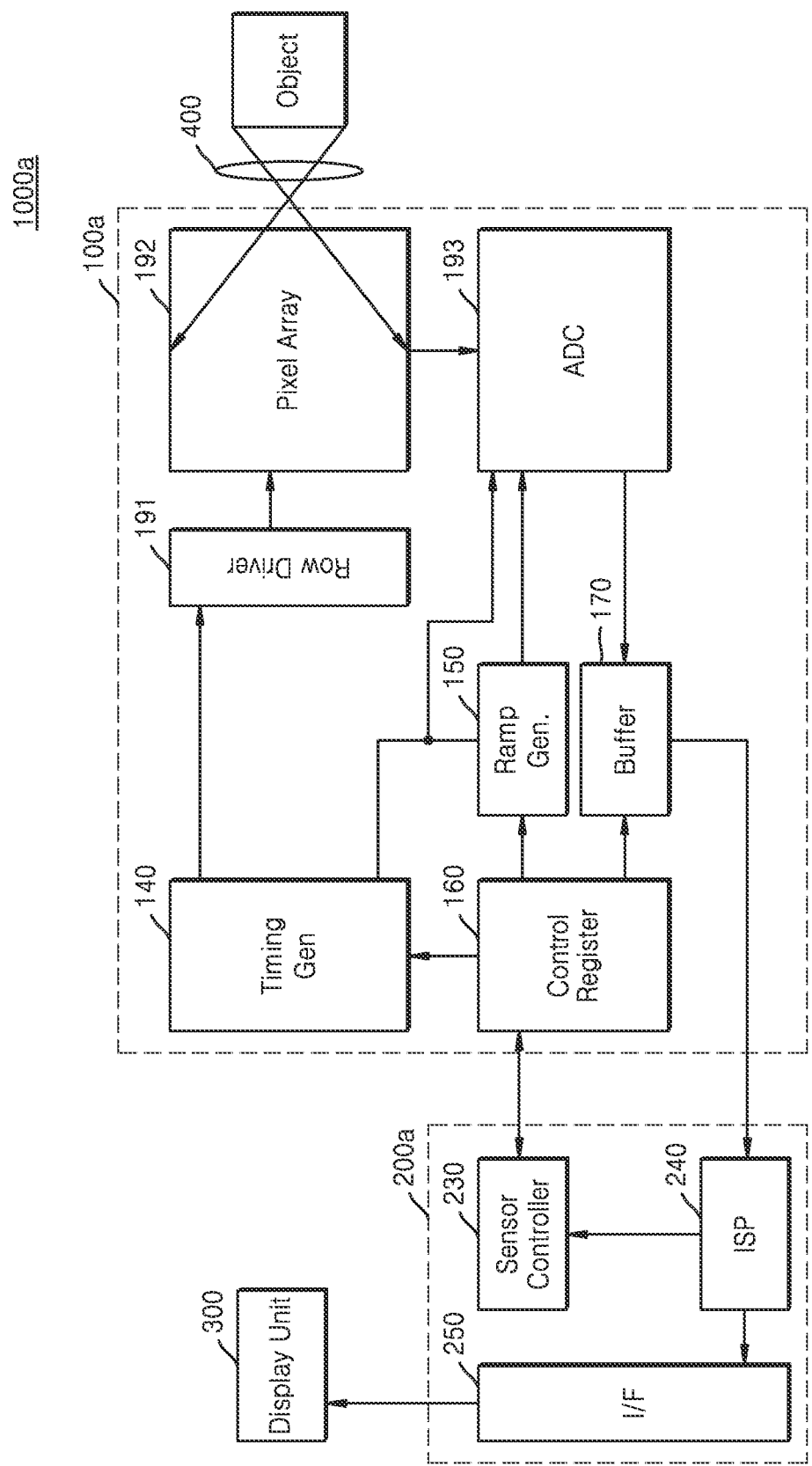
FIG. 1 is a block diagram schematically illustrating an imaging device according to some embodiments.

FIG. 1 is a block diagram schematically illustrating an imaging device 1000a according to some embodiments. The imaging device 1000a of FIG. 1 may be implemented by a portable device, e.g., a digital camera, a mobile phone, a smartphone, or a tablet personal computer (PC).

Referring to FIG. 1, the imaging device 1000a may include an image sensor 100a, an image processor 200a, and a display 300. The image sensor 100a may receive an image of an object, which is photographed or captured through an optical lens 400, convert a received optical signal into an electrical signal, and output the electrical signal. The image sensor 100a may correct the electrical signal and output corrected image data. The image sensor 100a may be implemented by a complementary metal-oxide semiconductor (CMOS) image sensor.

The image sensor 100a may include a pixel array 192, a row driver 191, a timing generator 140, an analog-to-digital converter (ADC) 193, a control register block 160, a ramp signal generator 150, and a buffer 170. The pixel array 192 may include a plurality of pixels (not shown) arranged in a matrix form and convert an optical image signal into an electrical pixel signal by using each of the plurality of pixels.

In some embodiments, the pixel array 192 may be implemented in a red, green, and blue (RGB) pixel format. That is, each pixel may be implemented by a red pixel configured to convert light in a red spectral range into an electrical signal, a green pixel configured to convert light in a green spectral range into an electrical signal, or a blue pixel configured to convert light in a blue spectral range into an electrical signal.

In other embodiments, the pixel array 192 may be implemented in a cyan, magenta, and yellow (CMY) pixel format. That is, each pixel may be implemented by a cyan pixel, a magenta pixel, or a yellow pixel.

The pixel array 192 may include a plurality of pixel groups having different exposure times. According to some embodiments, each pixel may be implemented by a photodiode or a pinned photodiode.

Under control by the timing generator 140, the row driver 191 may drive, to the pixel array 192, control signals for controlling respective operations of the plurality of pixels.

The row driver 191 may drive the pixel array 192 in a row unit. For example, the row driver 191 may generate a row select signal. That is, the row driver 191 may decode a row control signal (e.g., an address signal) generated by the timing generator 140 and select, in response to the decoded row control signal, at least one row line from among row lines constituting the pixel array 192. The pixel array 192 outputs, to the ADC 193, a pixel signal from a row selected based on the row select signal provided from the row driver 191. The pixel signal may include a reset signal and an image signal.

The ADC 193 may compare the pixel signal with a ramp signal provided from the ramp signal generator 150 to generate a result signal, count the result signal, convert the counted value into a digital signal, and output the digital signal to the buffer 170 as raw data. For example, the ADC 193 may be implemented by a column-parallel single-slope ADC.

The timing generator 140 controls operations of the row driver 191, the ADC 193, and the ramp signal generator 150 under control by the control register block 160.

The control register block 160 may control operations of the timing generator 140, the ramp signal generator 150, and the buffer 170. The control register block 160 operates under control by a sensor controller 230. The sensor controller 230 may be implemented by hardware or software or a combination thereof. In some embodiments, the control register block 160 may include a processor and an internal memory or at least one logic, may receive compressed configuration data from the sensor controller 230, and may decompress the received compressed configuration data.

The buffer 170 may output, to the image processor 200a, a plurality of pieces of raw data output from the ADC 193.

The image processor 200a may include an image signal processor 240, the sensor controller 230, and an interface 250.

The sensor controller 230 may control the control register block 160. The sensor controller 230 may control the image sensor 100a, i.e., the control register block 160, by using inter-integrated circuit (I2C) communication. However, the scope of the inventive concept is not limited thereto. In some embodiments, the sensor controller 230 may send compressed configuration data to the image sensor 100a.

The image signal processor 240 may control the interface 250 and the sensor controller 230 configured to control the control register block 160. According to some embodiments, the image sensor 100a and the image processor 200a may be implemented by a single package, e.g., a multi-chip package.

The image signal processor 240 may process the corrected image data received from the image sensor 100a and send the processed image data to the interface 250.

The interface 250 may send the image data processed by the image signal processor 240 to the display 300.

The display 300 displays the image data output from the interface 250. The display 300 may be implemented by a thin-film transistor liquid crystal display (TFT-LCD), a light-emitting diode (LED) display, an organic LED (OLED) display, or an active-matrix OLED (AMOLED) display.

The display 300 may include any device capable of outputting an image. For example, the display 300 may include a computer, a cellular phone, and other image output terminals.

Figure 2:
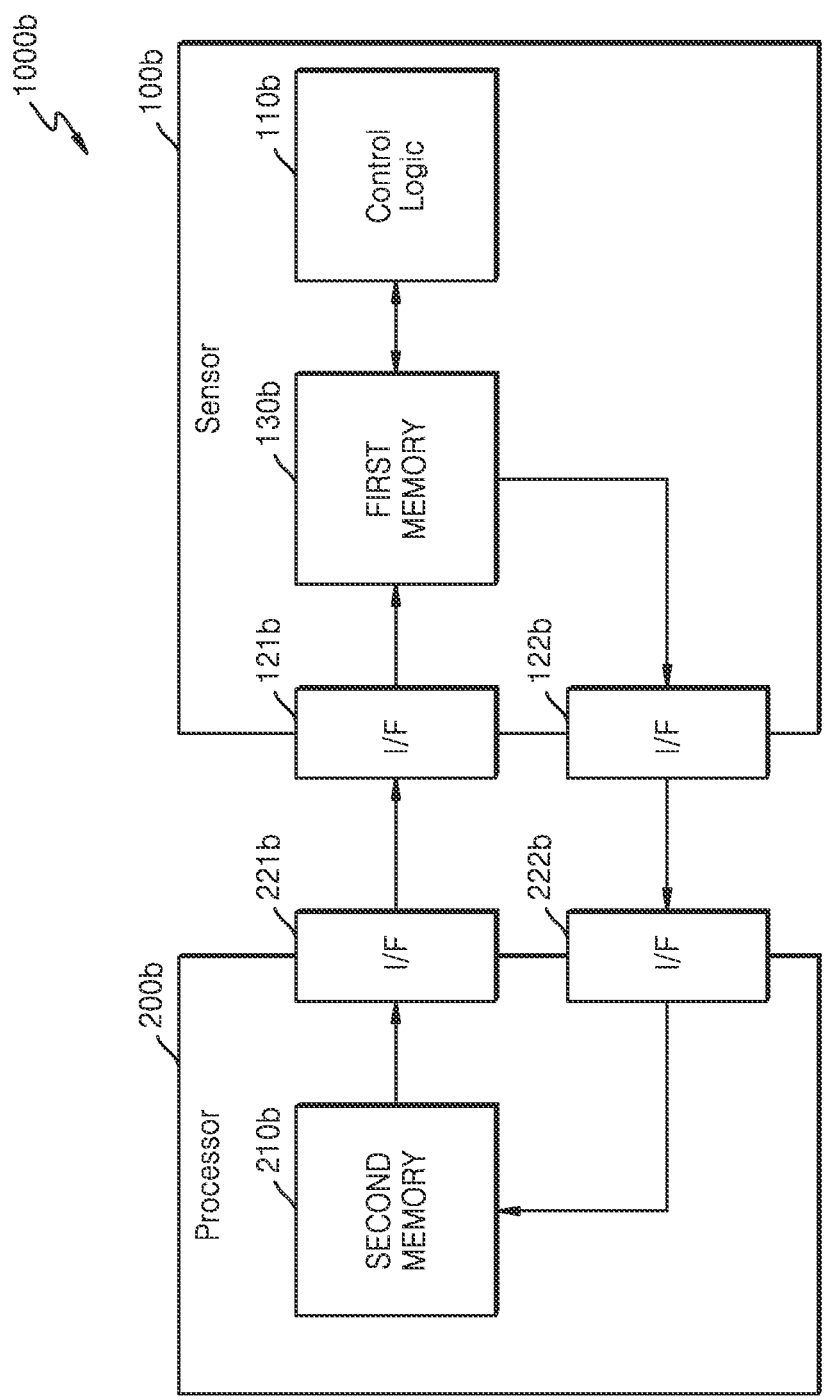
FIG. 2 is a block diagram illustrating an example of an imaging device according to some embodiments.

FIG. 2 is a block diagram illustrating an example of an imaging device according to some embodiments. An imaging device 1000b may be an example of the imaging device 1000a of FIG. 1. FIG. 2 schematically shows the imaging device 1000b to describe the technical idea of the inventive concept, but the technical idea of the inventive concept is not limited thereto. As shown in FIG. 2, the imaging device 1000b may include an image sensor 100b and an external processor 200b, and the image sensor 100b may include a control logic 110b (also referred to as a control logic circuit 110b), a plurality of interface circuits 121b and 122b, and a first memory 130b.

The interface circuit 121b may receive compressed data from the external processor 200b. In an example, the external processor 200b may receive compressed data from the outside (e.g., may be an application processor (AP), generate configuration data based on a sensor or a user's configuration, and generate compressed data by compressing the configuration data), store the received compressed data in a second memory 210b, and send the stored compressed data to the interface circuit 121b via an interface circuit 221b of the external processor 200b. For example, the compressed data may be compressed configuration data, and the compressed configuration data may include sensor calibration information including crosstalk (XTK) information, lens shading correction (LSC) information, and the like, firmware trap and patch (FW TnP), a sensor exposure time, a gain, and the like.

The interface circuit 121b may receive a control signal via the interface circuit 221b of the external processor 200b, and the other interface circuit 122b of the image sensor 100b may send image data via the other interface circuit 222b of the external processor 200b to the external processor 200b. In some embodiments, a first interface scheme (also referred to as a first communication) established between the interface circuits 121b and 221b may include an I2C scheme, a serial peripheral interface (SPI) scheme, or the like, and a second interface scheme (also referred to as a second communication) established between the interface circuits 122b and 222b may include a camera serial interface (CSI) scheme based on a mobile industry processor interface (MIPI), a mobile display digital interface (MDDI) scheme, a mobile current mode advanced differential signaling (CMADS) scheme, a mobile shrink data link (MSDL) scheme, or the like. The first interface scheme may be slower than the second interface scheme. For example, a data transmission rate of the first interface scheme may be lower than a data transmission rate of the second interface scheme.

The first memory 130b may store compressed data and decompressed data. In some embodiments, the first memory 130b may receive compressed data from the interface circuit 121b and store the received compressed data, and receive decompressed data from the control logic 110b and store the received decompressed data. The first memory 130b may allow a random access thereto. The first memory 130b may be implemented by a volatile memory, such as dynamic random access memory (DRAM) or static random access memory (SRAM), or a resistive memory, such as resistive random access memory (ReRAM) or magnetic random access memory (MRAM).

The control logic 110b may receive compressed data and decompress the received compressed data to generate decompressed data. In some embodiments, the control logic 110b may receive compressed data from the first memory 130b, generate first data containing an address and decompressed data information based on the compressed data, and store decompressed data in the first memory 130b by translating the first data. Some embodiments of the control logic 110b are described below with reference to FIGS. 3A and 3B. In some embodiments, because a size of compressed data is smaller than a size of non-compressed data, a data transmission time when the image sensor 100b receives compressed data from the external processor 200b is less than a data transmission time when the image sensor 100b receives non-compressed data from the external processor 200b, thereby reducing a data transmission latency. For example, the control logic 110b may be realized by using hardware, software, or a combination thereof.

Figure 3A:
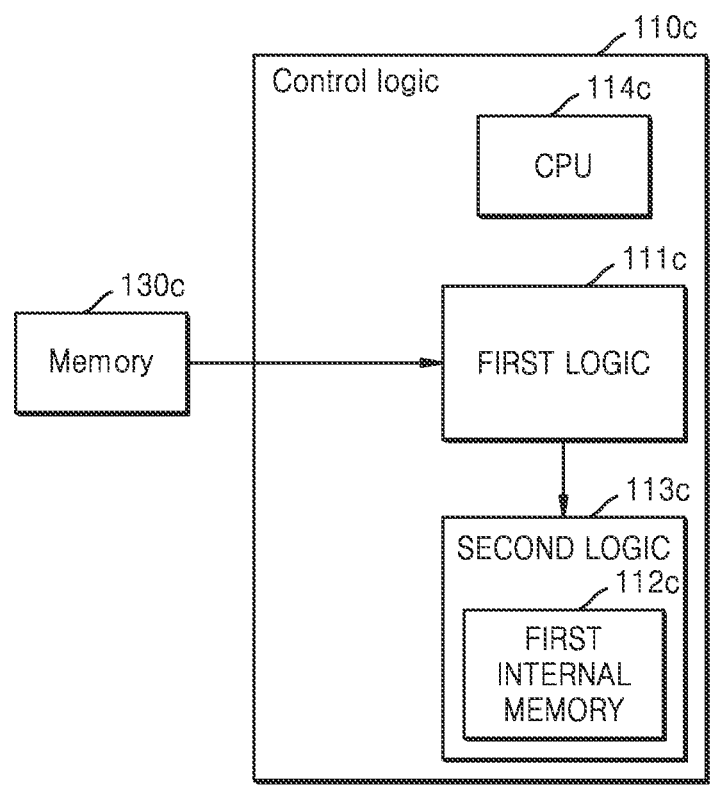
FIGS. 3A and 3B are block diagrams illustrating examples of a control logic according to some embodiments.
Figure 3B:
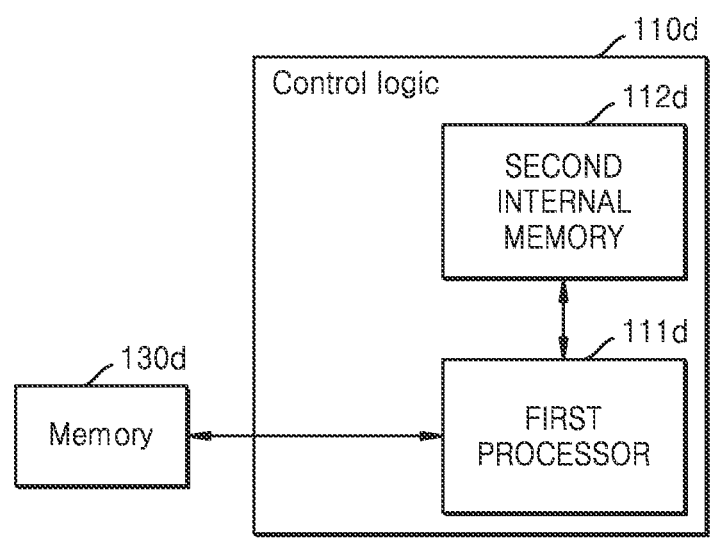

FIGS. 3A and 3B are block diagrams illustrating examples of a control logic according to embodiments. In some embodiments, a control logic 110c of FIG. 3A and a control logic 110d of FIG. 3B may be examples of the control logic 110b of FIG. 2. Referring to FIG. 3A, the control logic 110c may include a first logic 111c (also referred to as a first logic circuit 111c), a second logic 113c (also referred to as a second logic circuit 113c), and a central processing unit (CPU) 114c.

The first logic 111c may receive and decompress compressed data. In some embodiments, the first logic 111c may receive compressed data from a memory 130c and generate first data containing an address and decompressed data information based on the compressed data. For example, the first logic 111c may be a decompress logic.

The second logic 113c may store the decompressed data. In some embodiments, the second logic 113c may include a first internal memory 112c. For example, the first internal memory 112c may be implemented by a higher-level cache, SRAM, or the like. The second logic 113c may receive the first data from the first logic 111c and store the decompressed data in the first internal memory 112c by translating the first data. For example, the second logic 113c may be a decoding logic. For example, the second logic 113c may generate decompressed configuration data by decoding the first data generated by the first logic 111c.

The CPU 114c may execute a command based on stored data. In some embodiments, the CPU 114c may receive the decompressed data from the second logic 113c and perform an image sensor operation according to a command of an external processor based on the decompressed data. In some embodiments, the first logic 111c and the second logic 113c may perform a decompress and decode operation instead of the CPU 114c, and the decompressed data is stored in the second logic 113c, and thus, a memory use amount of the CPU 114c may be reduced.

Although it is described in the specification that the first logic 111c performs a decompress operation, and the second logic 113c performs a decode operation, embodiments of the inventive concept are not limited thereto. In some embodiments, the first logic 111c and the second logic 113c may be integrated into a logic, and the logic may perform a decompress and decode operation, include an internal memory, generate decompressed data by performing a decompress and decode operation on compressed data, and store the decompressed data in the internal memory.

Referring to FIG. 3B, the control logic 110d may include a first processor 111d and a second internal memory 112d. For example, the control logic 110d may be a CPU. The second internal memory 112d may store source code in which decompress and decode functions are programmed.

The first processor 111d may generate decompressed data based on compressed data. In some embodiments, the first processor 111d may receive compressed data from a memory 130d, may load, from the second internal memory 112d, the source code in which the decompress and decode functions are programmed, and may perform a decompress and decode operation on the compressed data by executing software. The first processor 111d may generate decompressed data by a decompress and decode operation on compressed data and store the decompressed data in the memory 130d.

In some embodiments, each of the decompress and decode functions may be implemented by software, hardware, or a combination, such as firmware, of software and hardware.

Figure 4:
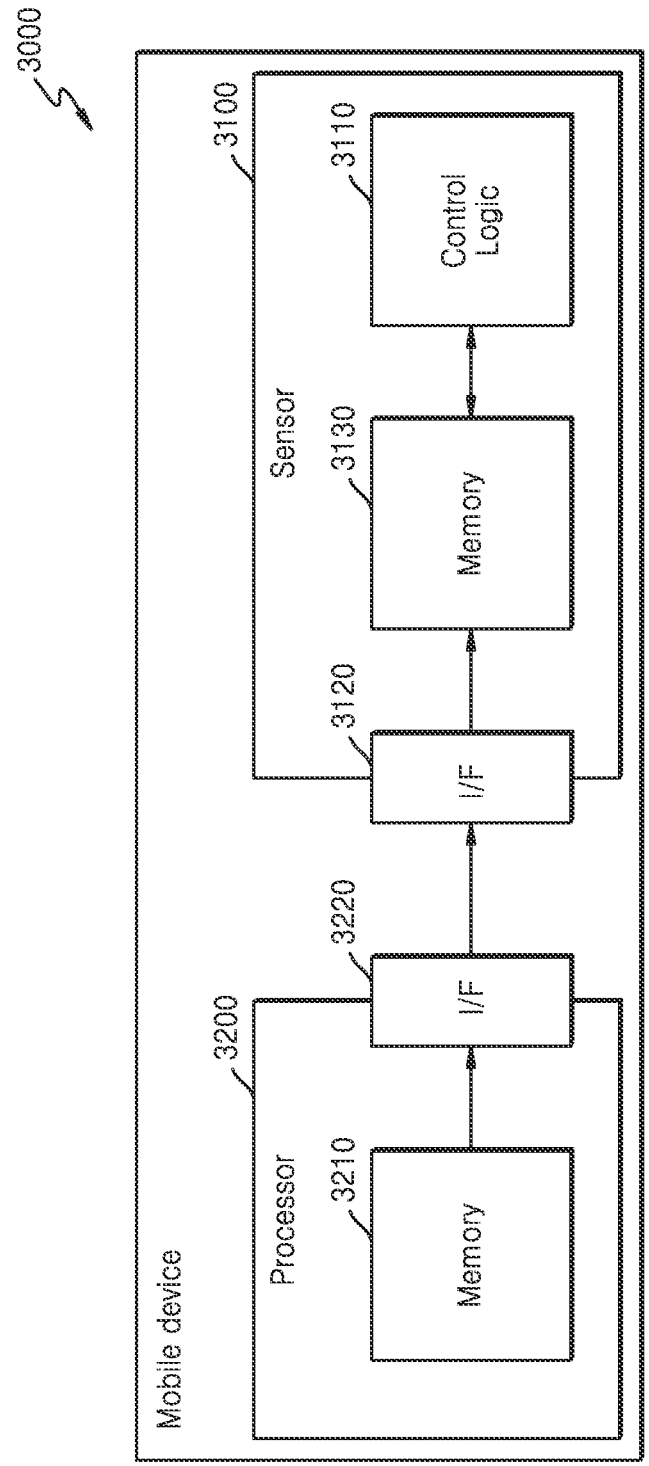
FIG. 4 is a block diagram illustrating a mobile device according to some embodiments.

FIG. 4 is a block diagram illustrating a mobile device 3000 according to some embodiments. In some embodiments, the mobile device 3000 of FIG. 4 may be an example of the imaging device 1000a of FIG. 1. Referring to FIG. 4, the mobile device 3000 may include a processor 3200 and an image sensor 3100.

The processor 3200 may receive compressed data from the outside (e.g., received externally) and send the compressed data to the image sensor 3100. In some embodiments, the processor 3200 may receive compressed data from the outside, store the received compressed data in a memory 3210, and send the stored compressed data to an interface 3120 of the image sensor 3100 via an interface 3220. The outside (e.g., where the processor 3200 receives the data from) may be an AP, may generate configuration data based on a sensor or a user's configuration, and may compress the configuration data.

In some embodiments, the processor 3200 may receive data from the outside, compress the received data, and send the compressed data to the image sensor 3100. For example, the outside may be an AP and may generate configuration data based on a sensor or a user's configuration, the processor 3200 may further include a compress logic (not shown) configured to compress the configuration data received from the outside, and the compress logic may compress the received configuration data and store the compressed configuration data in the memory 3210. The compress logic may be an encoding logic and may send compressed data to the interface 3120 of the image sensor 3100 via the interface 3220.

The image sensor 3100 may receive compressed data from the processor 3200. A description of the image sensor 3100 may be the same as described above with reference to FIG. 2.

Figure 5:
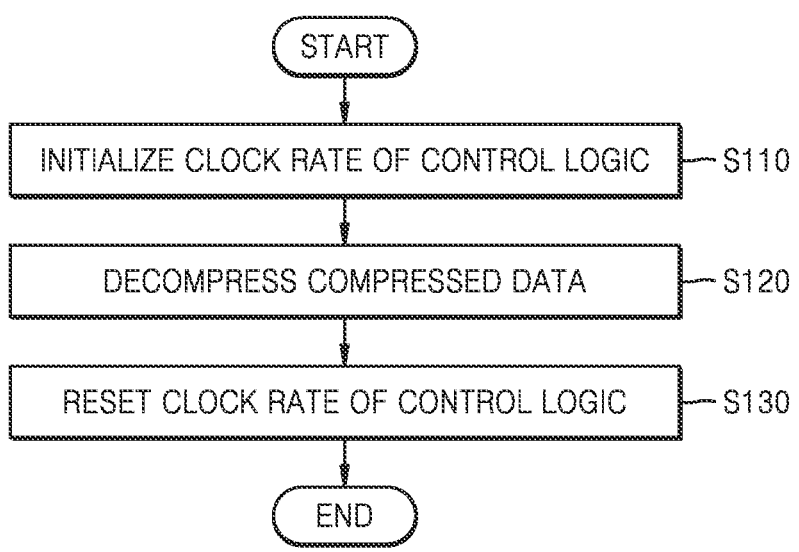
FIG. 5 is a flowchart illustrating an operation method of an image sensor, according to some embodiments.

FIG. 5 is a flowchart illustrating an operation method of an image sensor, according to some embodiments. As shown in FIG. 5, the operation method of an image sensor may include a plurality of operations S110 to S130.

Referring to FIGS. 2 and 5, in operation S110, a clock rate (in other words, an operating frequency) of the control logic 110b may be initialized. In some embodiments, the control logic 110b may be in a sleep mode, and thus, the clock rate of the control logic 110b may be minimized. Before the image sensor 100b receives compressed data, the clock rate of the control logic 110b may be initialized, and the initialized clock rate may be faster than a clock rate in the sleep mode.

In operation S120, the control logic 110b may decompress the compressed data. In some embodiments, the control logic 110b may receive compressed data from the first memory 130b, generate first data containing an address and decompressed data information based on the compressed data, and store decompressed data in the first memory 130b by translating the first data. Some embodiments of the control logic 110b may be the same as described above.

In operation S130, the clock rate of the control logic 110b may be reset after the control logic 110b decompresses the compressed data. In some embodiments, the initialized clock rate may be faster than or equal to the reset clock rate, and the reset clock rate may be faster than the clock rate in the sleep mode.

In some embodiments, the initialized clock rate may be 10 times faster than the reset clock rate, and a time, including a decompress and decode operation, taken to decompress compressed data when the initialized clock rate is the same as the reset clock rate is 10 times longer than a time taken to decompress the compressed data when the initialized clock rate is 10 times faster than the reset clock rate. Accordingly, if the initialized clock rate is faster than the reset clock rate, a decompression speed may be faster, thereby reducing a data transmission latency.

Figure 6:
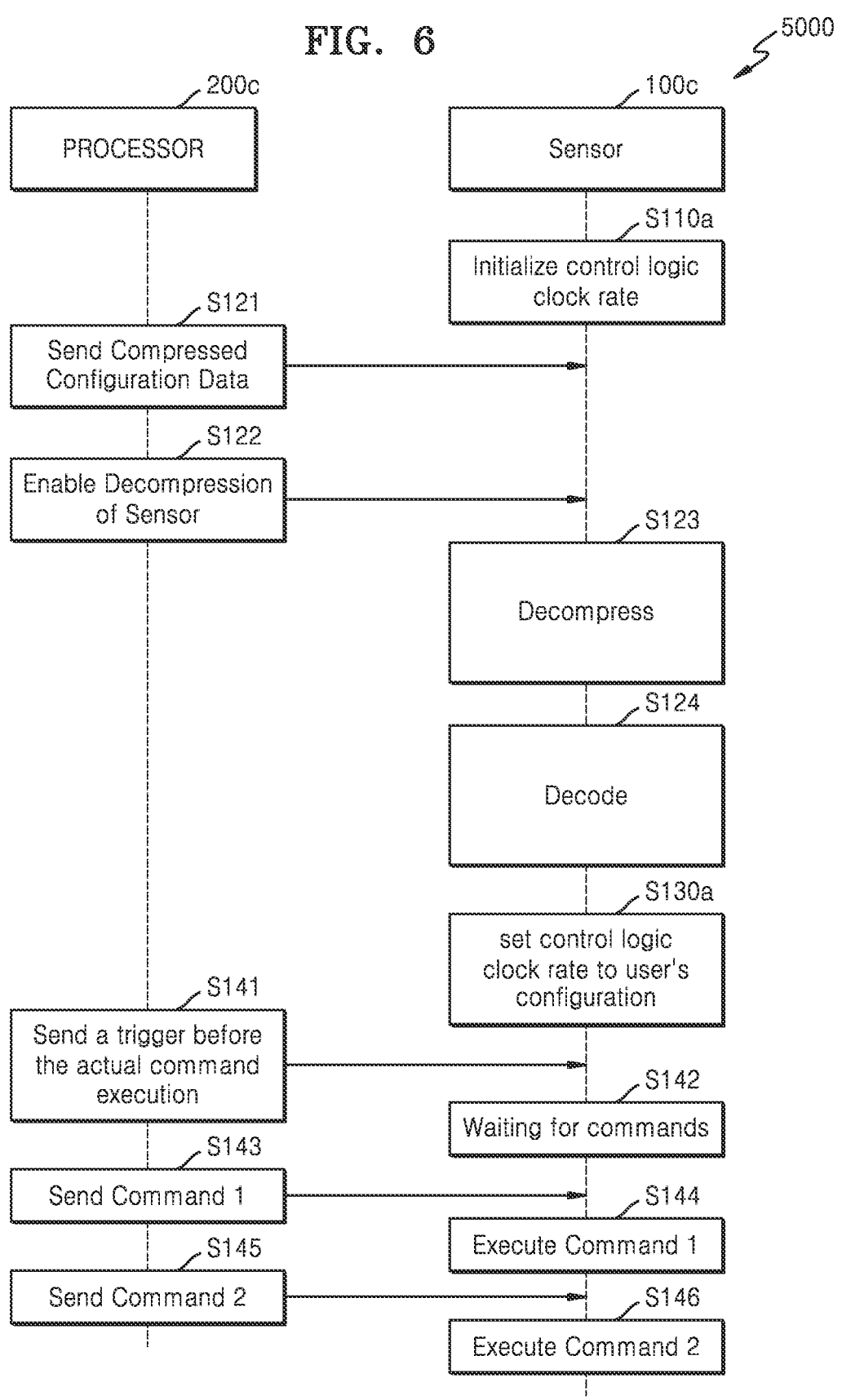
FIG. 6 is a signaling diagram illustrating a method, performed by a processor, of sending compressed configuration data to an image sensor, according to some embodiments.

FIG. 6 is a signaling diagram illustrating a method 5000, performed by a processor 200c, of sending compressed configuration data to an image sensor 100c, according to some embodiments. As shown in FIG. 6, the method 5000, performed by the processor 200c, of sending compressed configuration data to the image sensor 100c may include a plurality of operations S110a to S146.

Further, operations S110a to S130a may be the same as the image sensor operation method described above with reference to FIG. 5. In some embodiments, operation S110a may correspond to operation S110 of FIG. 5 in which the image sensor 100c initializes a control logic clock rate, and operations S121 to S124 may correspond to operation S120 of FIG. 5 of receiving compressed configuration data and a decompress signal from the processor 200c and then performing a decompress and decode operation to decompress the received compressed configuration data. Operation S130a may correspond to operation S130 of FIG. 5 in which the image sensor 100c resets the initialized clock rate after decompressing the compressed configuration data.

Referring to FIG. 6, operations S141 to S146 may illustrate a process in which the image sensor 100c performs commands after decompressing compressed data. In some embodiments, in operation S141, the processor 200c may send a trigger signal to the image sensor 100c after the image sensor 100c resets the initialized clock rate, the image sensor 100c may wait for commands from the processor 200c in operation S142 after receiving the trigger signal, the image sensor 100c may receive a command from the processor 200c in operation S143 and execute the received command in operation S144. For example, the processor 200c may sequentially send the trigger signal and the command (also referred to as a command signal) to the image sensor 100c in operations S141 and S143 after the image sensor 100c resets the initialized clock rate in operation S130a. If the number of commands to be executed by the image sensor 100c is more than 1, operations S145 and S146 in which the image sensor 100c receives a command from the processor 200c and executes the received command may be further included.

Figure 7A:
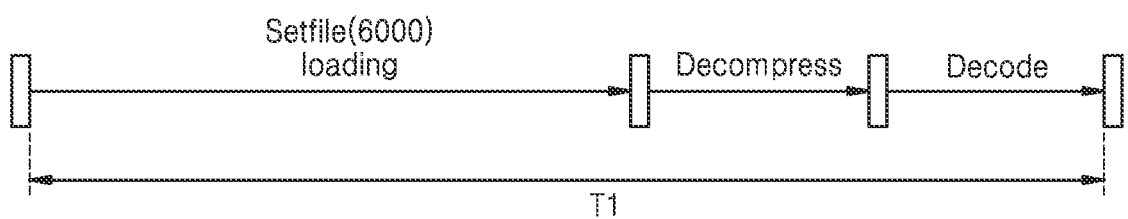
FIG. 7A illustrates a data transmission time according to a method of sending configuration data, according to some embodiments.
Figure 7B:
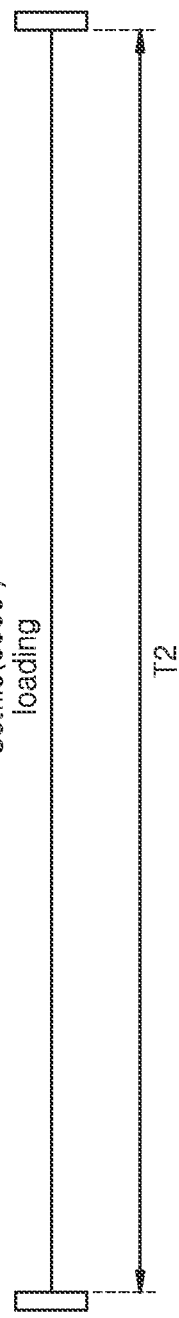
FIG. 7B illustrates a data transmission time according to a method of sending configuration data, according to a comparative example.

FIG. 7A illustrates a data transmission time according to a method of sending configuration data, according to some embodiments, and FIG. 7B illustrates a data transmission time according to a method of sending configuration data, according to a comparative example. Further referring to FIG. 6, each of the data transmission times in FIGS. 7A and 7B indicates a time taken for the image sensor 100c to obtain configuration data from the processor 200c.

Referring to FIG. 7A, the processor 200c may send a setfile 6000 including compressed configuration data to the image sensor 100c, and the image sensor 100c may receive the setfile 6000, and decompress the compressed configuration data by performing a decompress and decode operation on the compressed configuration data included in the received setfile 6000. Referring to FIGS. 6 and 7A, a data transmission time, i.e., a time taken to obtain configuration data, may be a time taken to perform operations S121 to S124. A time T1 may be taken for the image sensor 100c to load the setfile 6000 from the processor 200c and obtain configuration data by performing a decompress and decode operation on the setfile 6000.

Referring to FIG. 7B, according to the method of sending configuration data, according to a comparative example, the processor 200c may send the configuration data to the image sensor 100c without performing compression on the configuration data. The image sensor 100c may load a setfile 6000' including configuration data. Because the configuration data of FIG. 7B is not compressed, a decompress and decode operation is not performed on the configuration data. A time T2 may be taken for the image sensor 100c to load non-compressed configuration data from the processor 200c and obtain the configuration data.

Compared to when non-compressed data is received, when compressed data is received, a time may be further taken to perform a decompress and decode operation for decompression of the compressed data. However, a size of the compressed data is smaller than a size of the non-compressed data, and thus, a time taken to load the compressed data may be much less than a time taken to load the non-compressed data. Therefore, the data transmission time T1 according to the method of sending configuration data shown in FIG. 7A may be less than the data transmission time T2 according to the method of sending configuration data, according to the comparative example shown in FIG. 7B. Accordingly, a data transmission latency may be less when the image sensor 100c receives compressed configuration data and decompresses the received compressed configuration data than when the image sensor 100c receives non-compressed configuration data.

Figure 8:
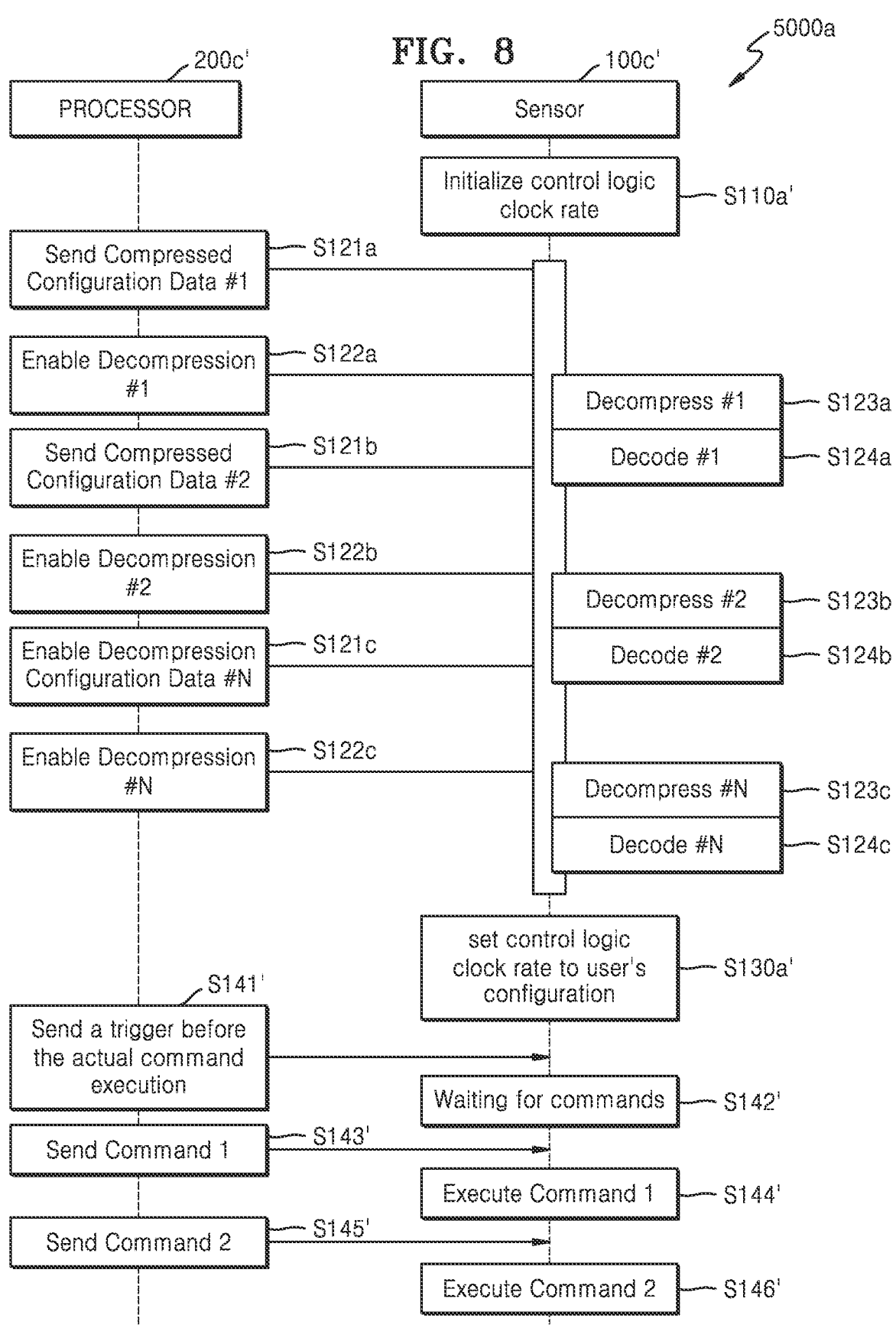
FIG. 8 is a signaling diagram illustrating a method, performed by a processor, of sending compressed configuration data to an image sensor by using a setfile dynamic loading (SDL) scheme, according to some embodiments.

FIG. 8 is a signaling diagram illustrating a method 5000a, performed by a processor 200c', of sending compressed configuration data to an image sensor 100c' by using a setfile dynamic loading (SDL) scheme, according to some embodiments. As shown in FIG. 8, the method 5000a, performed by the processor 200c', of sending compressed configuration data to the image sensor 100c' may include a plurality of operations S110a' to S146'.

Operations S110a' and S130a' to S146' may be the same as some operations of the method 5000, performed by the processor 200c, of sending compressed configuration data to the image sensor 100c, which has been described above with reference to FIG. 6. In some embodiments, operation S110a' may correspond to operation S110a of FIG. 6 in which the image sensor 100c' initializes a control logic clock rate, operations S130a' to S146' may correspond to operations S130a to S146 of FIG. 6 in which the image sensor 100c' resets the initialized clock rate after decompression, the processor 200c' sends a trigger signal to the image sensor 100c' after the image sensor 100c' resets the initialized clock rate, and the image sensor 100c' receives at least one command from the processor 200c' after receiving the trigger signal and executes the received at least one command. For example, the processor 200c' may sequentially send the trigger signal and the at least one command (also referred to as a command signal) to the image sensor 100c' in operations S141' and S143' after the image sensor 100c' resets the initialized clock rate in operation S130a'.

Operations S121a to S124c may indicate a method, performed by the image sensor 100c', of decompressing compressed configuration data by using the SDL scheme. The SDL scheme may be a scheme, performed by the image sensor 100c', of receiving a segmented piece of compressed configuration data, and receiving subsequent data while previously received data is being decompressed. In some embodiments, the compressed configuration data may be segmented into first compressed configuration data, second compressed configuration data, and third compressed configuration data, and in operation S121a, the image sensor 100c' may receive the first compressed configuration data from the processor 200c'. The image sensor 100c' may receive a decompress signal from the processor 200c' in operation S122a, decompress the first compressed configuration data by performing a decompress and decode operation on the first compressed configuration data in operations S123a and S124a, and simultaneously receive the second compressed configuration data from the processor 200c' in operation S121b. The image sensor 100c' may receive a decompress signal from the processor 200c' in operation S122b, decompress the second compressed configuration data by performing a decompress and decode operation on the second compressed configuration data in operations S123b and S124b, and simultaneously receive the third compressed configuration data from the processor 200c' in operation S121c. The image sensor 100c' may receive a decompress signal from the processor 200c' in operation S122c, and decompress the third compressed configuration data by performing a decompress and decode operation on the third compressed configuration data in operations S123c and S124c. In the SDL scheme described above, compressed configuration data is segmented into first compressed configuration data to third compressed configuration data, but the scope of the inventive concept is not limited thereto.

Figure 9:
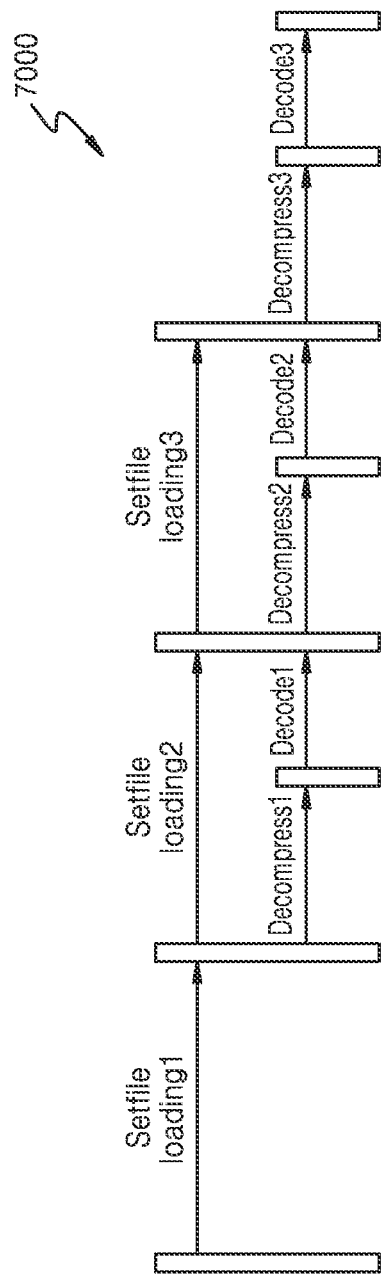
FIG. 9 illustrates a data transmission time using the SDL scheme, according to some embodiments.

FIG. 9 illustrates a data transmission time 7000 using the SDL scheme, according to some embodiments. Referring to FIGS. 8 and 9, the data transmission time 7000 using the SDL scheme may be a time taken to perform operations S121a to S124c. In some embodiments, the compressed configuration data may be segmented into the first compressed configuration data to the third compressed configuration data in operations S121a to S124c, and a time taken for the image sensor 100c' to receive the first compressed configuration data to the third compressed configuration data from the processor 200c' and decompress the first compressed configuration data to the third compressed configuration data by using the SDL scheme may be the same as the data transmission time 7000.

According to data transmission using the SDL scheme, a data receive process and a data decompress process may be performed in parallel to each other. In some embodiments, the image sensor 100c' may receive compressed configuration data from the processor 200c', and the compressed configuration data may be segmented into first compressed configuration data, second compressed configuration data, and third compressed configuration data. In a setfile loading 1 operation, the image sensor 100c' may receive the first compressed configuration data from the processor 200c', in a setfile loading 2 operation, the image sensor 100c' may receive the second compressed configuration data from the processor 200c', and in decompress 1 and decode 1 operations, the image sensor 100c' may decompress the first compressed configuration data in parallel to the setfile loading 2 operation. In a setfile loading 3 operation, the image sensor 100c' may receive the third compressed configuration data from the processor 200c', and in decompress 2 and decode 2 operations, the image sensor 100c' may decompress the second compressed configuration data in parallel to the setfile loading 3 operation. After the setfile loading 3 operation, the image sensor 100c' may decompress the third compressed configuration data in decompress 3 and decode 3 operations. For example, the image sensor 100c' may successively receive (e.g., through an interface circuit therein) the first compressed configuration data, the second compressed configuration data, and the third compressed configuration data, and the image sensor 100c' may successively decompress (e.g., by a control logic therein) the first compressed configuration data, the second compressed configuration data, and the third compressed configuration data. For example, a first operation (e.g., the setfile loading 2 operation) that includes the image sensor 100c' receiving (e.g., through the interface circuit therein) the second compressed configuration data may overlap in time with a second operation (e.g., the decompress 1 and decode 1 operations) that includes the image sensor 100c' decompressing (e.g., by the control logic therein) the first compressed configuration data, and a third operation (e.g., the setfile loading 3 operation) that includes the image sensor 100c' receiving (e.g., through the interface circuit therein) the third compressed configuration data may overlap in time with a fourth operation (e.g., the decompress 2 and decode 2 operations) that includes the image sensor 100c' decompressing (e.g., by the control logic therein) the second compressed configuration data.

According to the SDL scheme, compressed configuration data may be segmented and sent, and a time taken to perform a decompress and decode operation on a previously received piece of the compressed configuration data may overlap at least a portion of a setfile loading time. Accordingly, a data transmission time may be less taken when the SDL scheme is used than when the SDL scheme is not used. For example, a data length when the SDL scheme is used may be about 60% of a data length when the SDL scheme is not used, and thus, when the image sensor 100c' performs decompression on compressed data by using the SDL scheme, a data transmission latency may be reduced.

Figure 10:
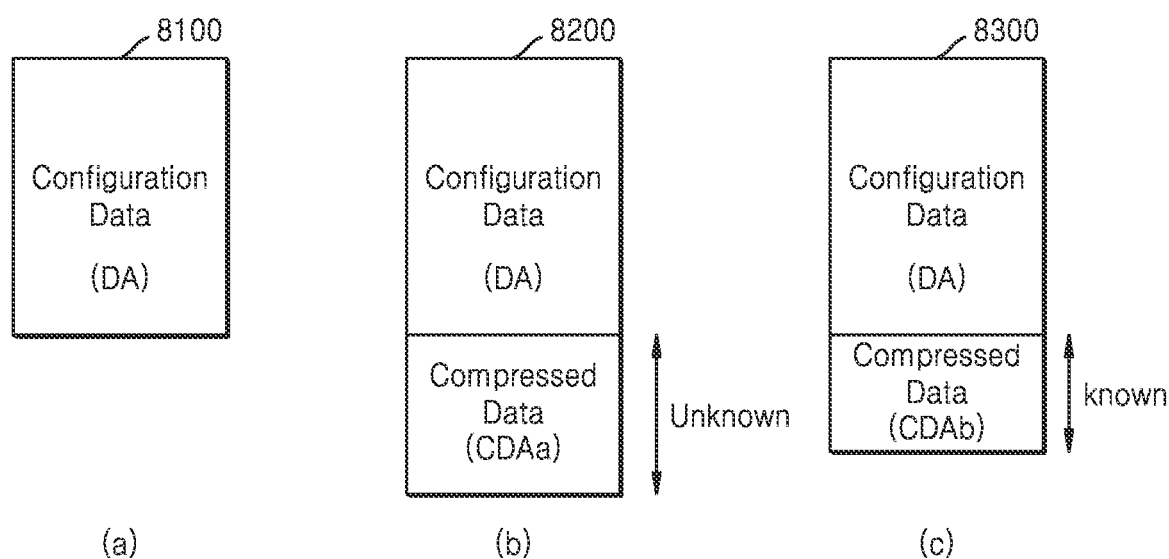
FIG. 10 is a series of block diagrams illustrating memory use amounts in an image sensor.

FIG. 10 is a series of block diagrams illustrating memory use amounts in an image sensor. The image sensor may store, in a memory, configuration data received from an external processor. For example, the image sensor may store the configuration data in the second internal memory 112d (see FIG. 3B) included therein. As another example, the image sensor may store the configuration data in a memory provided outside the image sensor.

Block diagram (a) of FIG. 10 shows a memory use amount 8100 when non-compressed configuration data is received from the external processor and stored in the memory, block diagram (b) of FIG. 10 shows a memory use amount 8200 when compressed configuration data is received from the external processor and decompressed, and block diagram (c) of FIG. 10 shows a memory use amount 8300 when compressed configuration data is received and decompressed based on the SDL scheme.

When non-compressed data is received, as shown in block diagram (a), the received data (i.e., the received configuration data) may be immediately stored in a data storage area DA of the memory. When compressed data is received, as shown in block diagrams (b) and (c), the compressed data may be immediately stored in a data storage area CDAa or CDAb. The stored compressed data may be decompressed and stored in the data storage area DA. Therefore, when compressed data is received, an area in which the compressed data is stored may be further required.

Referring to FIGS. 3B and 10, if data received by the control logic 110d is segmented compressed data, and if compressed configuration data is received and decompressed based on the SDL scheme, the memory use amount 8300 may be required, and because a storage space size (a size of the data storage area CDAb) of the second internal memory 112d in which the segmented compressed data is stored may be preset according to a size of the segmented compressed data, the data storage area CDAa may be greater than the data storage area CDAb, and the memory use amount 8300 when the compressed configuration data is received and decompressed based on the SDL scheme may be less than the memory use amount 8200 when the compressed configuration data is received from the external processor and decompressed. For example, the second internal memory 112d (or a memory provided outside the image sensor) may be allocated storage space that is a size of the segmented compressed data (e.g., the first compressed configuration data, the second compressed configuration data, and/or the third compressed configuration data). Accordingly, when the image sensor decompress segmented compressed data by using the SDL scheme, the image sensor may efficiently use the memory in the image sensor.

Figure 11:
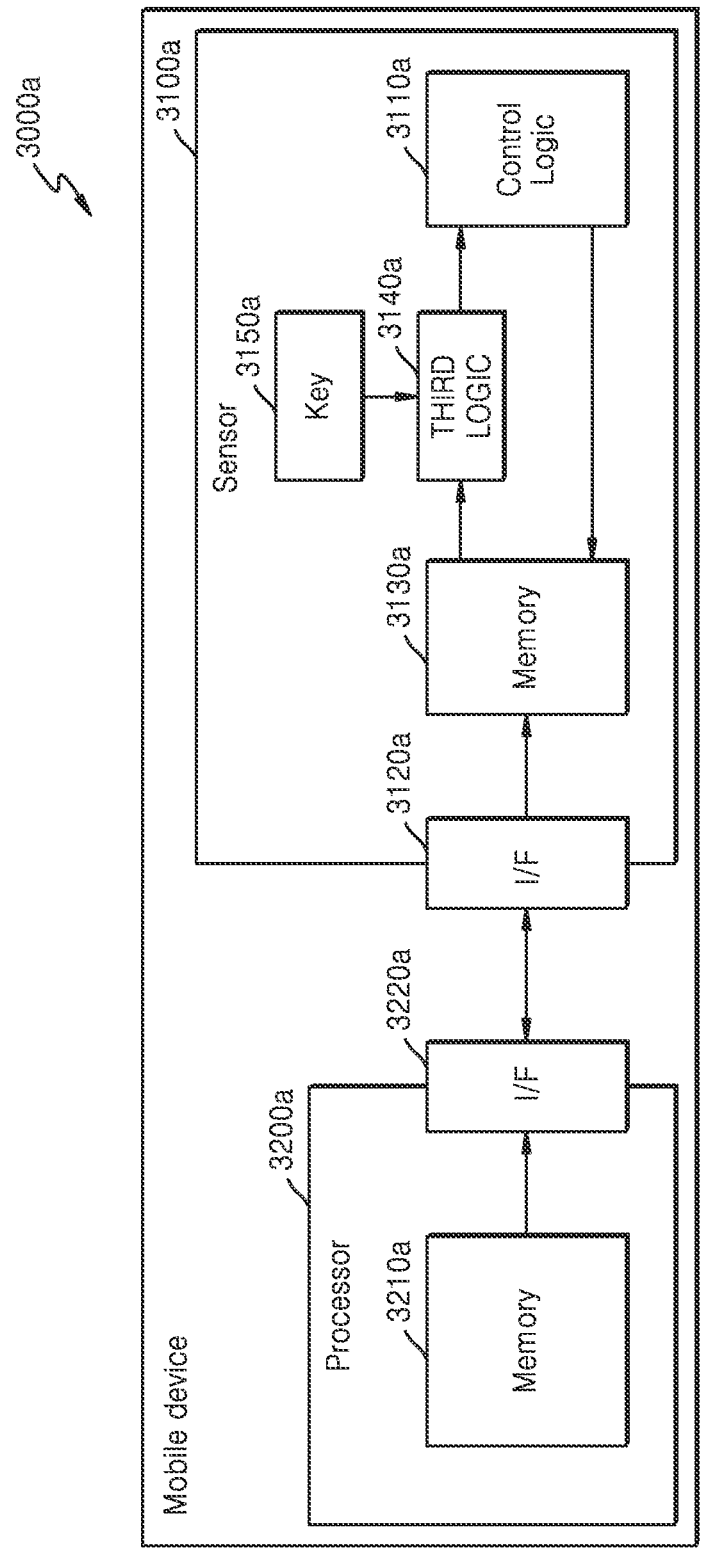
FIG. 11 is a block diagram illustrating an example of a mobile device according to some embodiments.

FIG. 11 is a block diagram illustrating an example of a mobile device 3000a according to some embodiments. In some embodiments, the mobile device 3000a of FIG. 11 may be an example of the mobile device 3000 of FIG. 4. Referring to FIG. 11, the mobile device 3000a may include a processor 3200a and an image sensor 3100a.

The processor 3200a may operate in the same manner as the processor 3200 of FIG. 4. In some embodiments, the processor 3200a may receive encrypted compressed data from a user, store the encrypted compressed data in a memory 3210a, and send the stored encrypted compressed data to an interface 3120a of the image sensor 3100a via an interface 3220a.

The image sensor 3100a may operate in the same manner as the image sensor 3100 of FIG. 4 but may further include a third logic 3140a (also referred to as a third logic circuit 3140a). The third logic 3140a may decrypt the encrypted compressed data based on a key 3150a. In some embodiments, the encrypted compressed data received from the processor 3200a via the interface 3120a may be stored in a memory 3130a. The third logic 3140a may receive the encrypted compressed data from the memory 3130a, generate decrypted compressed data by decrypting the encrypted compressed data based on the key 3150a, and send the decrypted compressed data to a control logic 3110a. The control logic 3110a may decompress the decrypted compressed data. For example, the control logic 3110a may receive the compressed data from the processor 3200a via the interface 3220a, the interface 3120a, the memory 3130a, and the third logic 3140a by which the compressed data is decrypted. In some embodiments, the third logic 3140a may be a decryptor. For example, the third logic 3140a may be realized by using hardware, software, or a combination thereof.

In some embodiments, the control logic 3110a may perform the function of the third logic 3140a. For example, the control logic 3110a may include a processor (not shown) and an internal memory (not shown), the processor (not shown) may load, from the internal memory (not shown), source code in which a decryption function is programmed, and generate the decrypted compressed data by executing software to decrypt the encrypted compressed data based on the key 3150a. For example, the control logic 3110a may decrypt the encrypted compressed data based on the key 3150a and decompress the decrypted compressed data.

Figure 12:
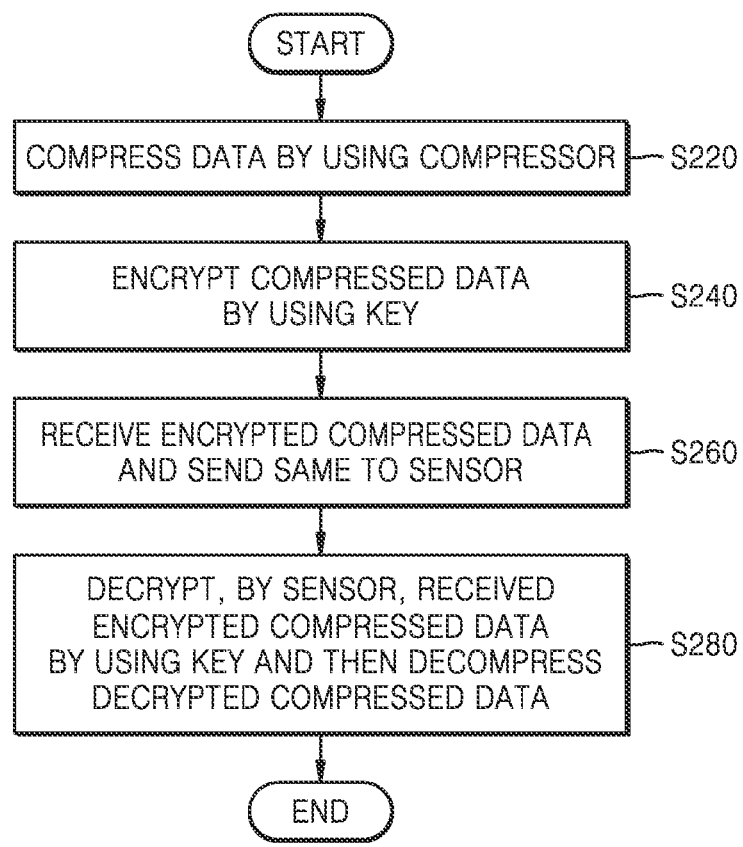
FIG. 12 is a flowchart illustrating a method of compressing and encrypting configuration data and a decryption and decompression method.

FIG. 12 is a flowchart illustrating a method of compressing and encrypting configuration data and a decryption and decompression method. As shown in FIG. 12, the method of compressing and encrypting configuration data and the decryption and decompression method may include a plurality of operations S220 to S280.

Referring to FIGS. 11 and 12, in operations S220 and S240, configuration data may be compressed and then encrypted in the outside (e.g., external to the processor 3200a). In some embodiments, the configuration data may be compressed by using a compressor (not shown), and the compressed configuration data may be generated. The compressed configuration data may be encrypted based on the key 3150a by using an external logic (not shown), and the encrypted compressed configuration data may be generated.

In operations S260 and S280, the image sensor 3100a may decrypt the encrypted compressed configuration data based on the key 3150a, and then the decrypted compressed configuration data may be decompressed. In some embodiments, the image sensor 3100a may receive the encrypted compressed configuration data from the processor 3200a, and the third logic 3140a may decrypt the encrypted compressed configuration data based on the key 3150a. The control logic 3110a may receive the decrypted compressed configuration data from the third logic 3140a, decompress the decrypted compressed configuration data, and store the decompressed configuration data in the memory 3130a.

In some embodiments, because the image sensor 3100a executes a command based on the encrypted compressed configuration data, even when the encrypted compressed configuration data is exposed to the outside, information about the configuration data may not be leaked.

Figure 13A:
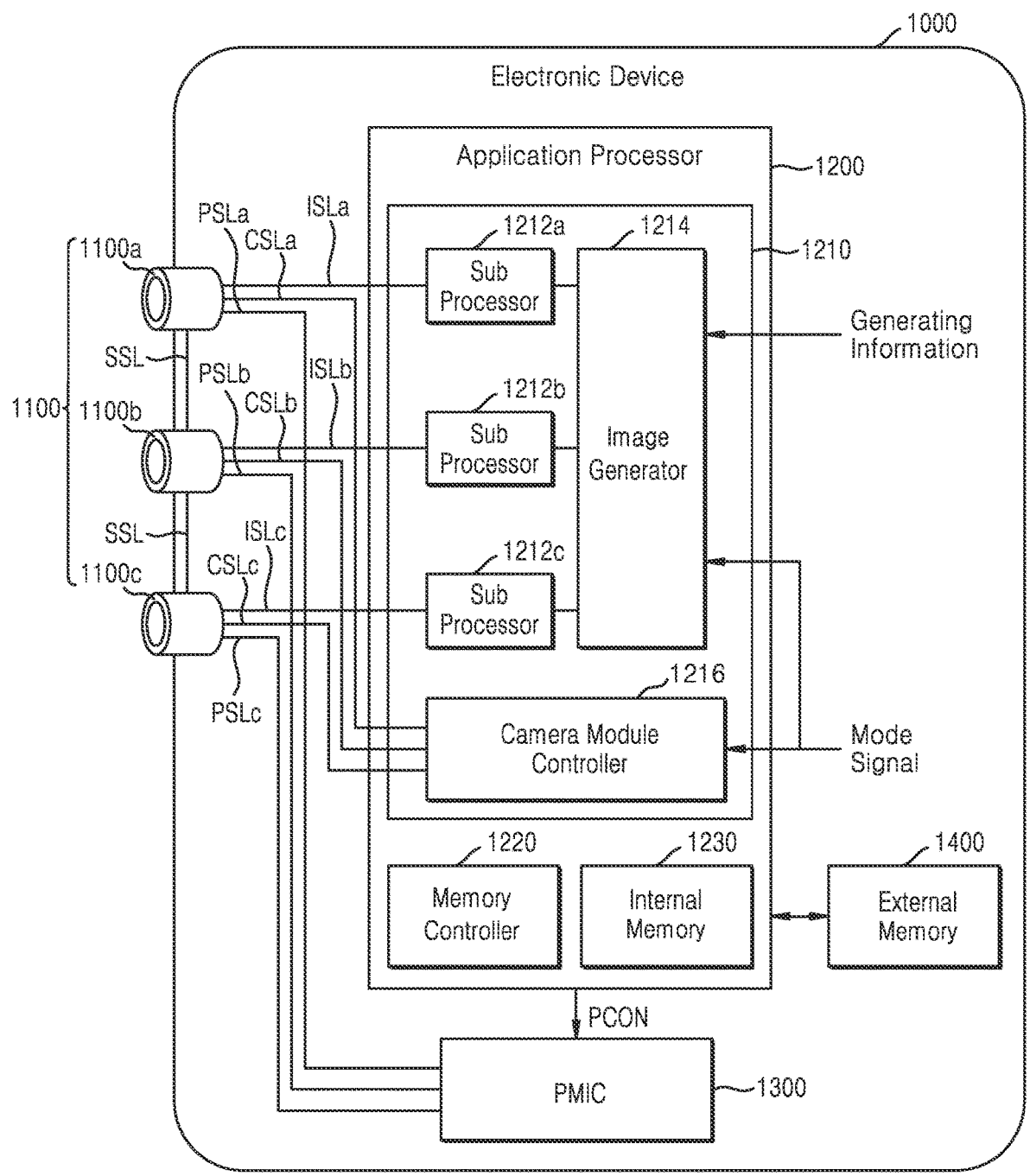
FIGS. 13A and 13B are block diagrams illustrating an electronic device including a multi-camera module.
Figure 13B:
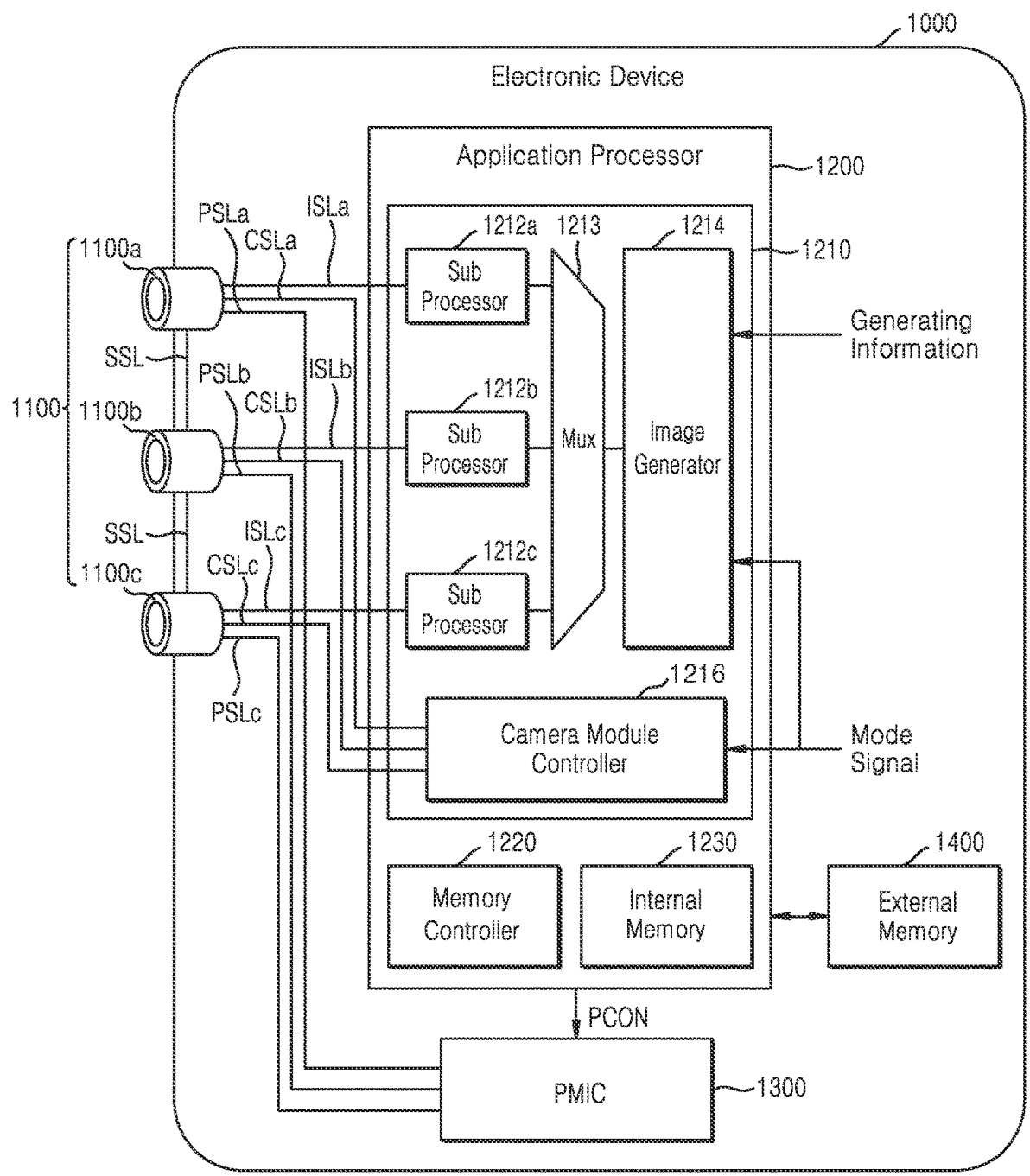
Figure 14:
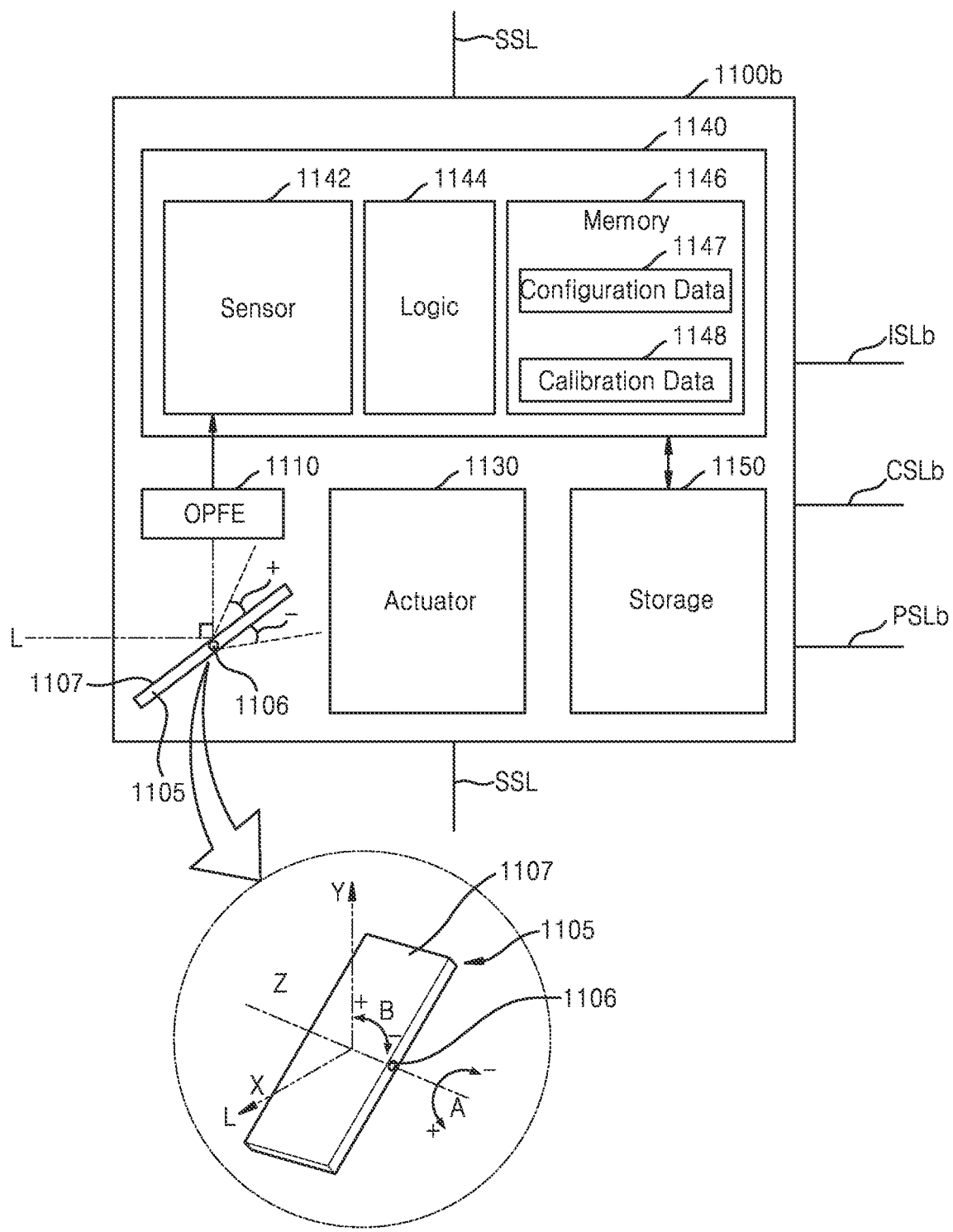
FIG. 14 is a detailed block diagram illustrating a camera module of FIGS. 13A and 13B.

FIGS. 13A and 13B are block diagrams illustrating an electronic device 1000 including a multi-camera module. FIG. 14 is a detailed block diagram illustrating a camera module 1100b of FIGS. 13A and 13B.

Referring to FIG. 13A, the electronic device 1000 may include a camera module group 1100, an AP 1200, a power management integrated circuit (PMIC) 1300, and an external memory 1400.

The camera module group 1100 may include a plurality of camera modules 1100a, 1100b, and 1100c. Although FIG.

13A shows that three camera modules 1100a, 1100b, and 1100c are arranged, embodiments are not limited thereto. In some embodiments, the camera module group 1100 may be modified and include two camera modules or n (n is a natural number greater than or equal to 4) camera modules.

A detailed construction of the camera module 1100b is described below in more detail with reference to FIG. 14, and the description to be made below may also be applied to the other camera modules 1100a and 1100c.

Referring to FIG. 14, the camera module 1100b may include a prism 1105, an optical path folding element (OPFE) 1110, an actuator 1130, an image sensing device 1140, and a storage 1150.

The prism 1105 may include a reflective surface 1107 of a light reflective material to change a path of light L incident from the outside.

In some embodiments, the prism 1105 may change a path of the light L incident in a first direction X to a second direction Y that is perpendicular to the first direction X. In addition, the prism 1105 may change a path of the light L incident in the first direction X to the second direction Y by rotating the reflective surface 1107 of a light reflective material in an A direction around a central axis 1106 or rotating the central axis 1106 in a B direction. In this case, the OPFE 1110 may also move in a third direction Z that is perpendicular to the first direction X and the second direction Y.

In some embodiments, as shown in FIG. 14, a maximum rotating angle of the prism 1105 in the A direction may be 15 degrees or less in a +A direction and greater than 15 degrees in a −A direction, but embodiments are not limited thereto.

In some embodiments, the prism 1105 may move at about 20 degrees, between 10 degrees and 20 degrees, or between 15 degrees and 20 degrees in a +B or −B direction. The moving angles in the +B and −B directions may be the same or similar in a range of about one degree.

In some embodiments, the prism 1105 may move the reflective surface 1107 of a light reflective material in the third direction Z parallel to an extending direction of the central axis 1106.

In some embodiments, the camera module 1100b may include two or more prisms and thus may variously change a path of the light L incident in the first direction X, for example, to the second direction Y that is perpendicular to the first direction X, then to the first direction X or the third direction Z, and then to the second direction Y.

The OPFE 1110 may include a group of m (m is a natural number) optical lenses. The m optical lenses may move in the second direction Y to change an optical zoom ratio of the camera module 1100b. For example, assuming that a default optical zoom ratio of the camera module 1100b is Z, if the m optical lenses included in the OPFE 1110 move, the optical zoom ratio of the camera module 1100b may change to 3Z, 5Z, or greater than 5Z.

The actuator 1130 may move the OPFE 1110 or the m optical lenses (hereinafter, referred to as an optical lens) to a particular position. For example, the actuator 1130 may adjust a position of the optical lens so that an image sensor 1142 is positioned at a focal length of the optical lens for accurate sensing.

The image sensing device 1140 may include the image sensor 1142, a control logic 1144, and a memory 1146. The image sensor 1142 may sense an image of an object to be sensed, by using the light L provided through the optical lens. The control logic 1144 may control a general operation of the camera module 1100b and process a sensed image.

For example, the control logic 1144 may control an operation of the camera module 1100b in response to a control signal provided through a control signal line CSLb and extract image data (e.g., the face, the arms, the legs, or the like of a human being in an image) corresponding to a particular image in the sensed image.

In some embodiments, the control logic 1144 may perform image processing, such as encoding and noise reduction, on the sensed image. In some embodiments, the control logic 1144 may receive compressed configuration data through the control signal line CSLb and decompress the received compressed configuration data.

The memory 1146 may store information, such as configuration data 1147 or calibration data 1148, required for an operation of the camera module 1100b. The memory 1146 may store compressed configuration data and decompressed configuration data. The configuration data 1147 may include sensor calibration information including XTK information, LSC information, and the like, FW TnP, a sensor exposure time, a gain, and the like. The calibration data 1148 is information required for the camera module 1100b to generate image data by using the light L provided from the outside and may include, for example, information regarding a degree of rotation, information regarding a focal length, information regarding an optical axis, and the like. When the camera module 1100b is implemented in the form of a multi-state camera of which a focal length varies according to a position of the optical lens, the calibration data 1148 may include a focal length value per position (or per state) of the optical lens and information regarding autofocusing.

The storage 1150 may store image data sensed by the image sensor 1142. The storage 1150 may be outside the image sensing device 1140 and may be implemented in a stacked form with a sensor chip constituting the image sensing device 1140. In some embodiments, the image sensor 1142 may be implemented by a first chip, and the control logic 1144, the storage 1150, and the memory 1146 may be implemented by a second chip. The first and second chips may be stacked on one another.

In some embodiments, the storage 1150 may be implemented by electrically erasable programmable read-only memory (EEPROM), but embodiments are not limited thereto. In some embodiments, the image sensor 1142 may include a pixel array, and the control logic 1144 may include an analog-to-digital converter and an image signal processor configured to process a sensed image.

Referring to FIGS. 13A and 14, in some embodiments, each of the plurality of camera modules 1100a, 1100b, and 1100c may include the actuator 1130. Accordingly, each of the plurality of camera modules 1100a, 1100b, and 1100c may include the same or different calibration data 1148 according to an operation of the actuator 1130 included therein.

In some embodiments, one (e.g., the camera module 1100b) of the plurality of camera modules 1100a, 1100b, and 1100c may be a folded lens-type camera module including the prism 1105 and the OPFE 1110 described above, and the other camera modules (e.g., the camera modules 1100a and 1100c) may be vertical-type camera modules in which the prism 1105 and the OPFE 1110 are not included, but the plurality of camera modules 1100a, 1100b, and 1100c are not limited thereto.

In some embodiments, one (e.g., the camera module 1100c) of the plurality of camera modules 1100a, 1100b, and 1100c may be, for example, a vertical-type depth camera configured to extract depth information by using an infrared (IR) ray. In this case, the AP 1200 may generate a three-dimensional (3D) depth image by merging image data received from the depth camera with image data received from another camera module (e.g., the camera module 1100a or 1100b).

In some embodiments, at least two (e.g., the camera modules 1100a and 1100b) of the plurality of camera modules 1100a, 1100b, and 1100c may have different fields of view. In this case, for example, optical lenses of the at least two (e.g., the camera modules 1100a and 1100b) of the plurality of camera modules 1100a, 1100b, and 1100c may differ from each other but are not limited thereto.

In addition, in some embodiments, the fields of view of the plurality of camera modules 1100a, 1100b, and 1100c may differ from each other. For example, the camera module 1100a may be an ultrawide camera, the camera module 1100b may be a wide camera, and the camera module 1100c may be a tele camera, but the plurality of camera modules 1100a, 1100b, and 1100c are not limited thereto. In this case, the optical lenses respectively included in the plurality of camera modules 1100a, 1100b, and 1100c may also differ from each other but are not limited thereto.

In some embodiments, the plurality of camera modules 1100a, 1100b, and 1100c may be physically separated from each other. That is, instead of a sensing area of one image sensor 1142 being divided and used by the plurality of camera modules 1100a, 1100b, and 1100c, an independent image sensor 1142 may be inside each of the plurality of camera modules 1100a, 1100b, and 1100c.

Referring back to FIG. 13A, the AP 1200 may include an image processing device 1210, a memory controller 1220, and an internal memory 1230. The AP 1200 may be implemented by, for example, a separate semiconductor chip separated from the plurality of camera modules 1100a, 1100b, and 1100c.

The image processing device 1210 may include a plurality of sub-image processors 1212a, 1212b, and 1212c, an image generator 1214, and a camera module controller 1216.

The image processing device 1210 may include the plurality of sub-image processors 1212a, 1212b, and 1212c corresponding in number to the plurality of camera modules 1100a, 1100b, and 1100c.

Image data generated by the camera module 1100a may be provided to the sub-image processor 1212a through an image signal line ISLa, image data generated by the camera module 1100b may be provided to the sub-image processor 1212b through an image signal line ISLb, and image data generated by the camera module 1100c may be provided to the sub-image processor 1212c through an image signal line ISLc. This image data transmission may be performed by using, for example, a CSI based on an MIPI but is not limited thereto.

However, in some embodiments, one sub-image processor may correspond to a plurality of camera modules. For example, instead of the sub-image processor 1212a and the sub-image processor 1212c being separated from each other as shown in FIG. 13A, the sub-image processor 1212a and the sub-image processor 1212c may be integrated into one sub-image processor, and one of pieces of image data provided from the camera module 1100a and the camera module 1100c may be selected by a select element (e.g., a multiplexer) or the like and then provided to the integrated sub-image processor. In this case, the sub-image processor 1212b may not be integrated into the integrated sub-image processor and may receive image data from the camera module 1100b.

In addition, in some embodiments, image data generated by the camera module 1100a may be provided to the sub-image processor 1212a through the image signal line ISLa, image data generated by the camera module 1100b may be provided to the sub-image processor 1212b through the image signal line ISLb, and image data generated by the camera module 1100c may be provided to the sub-image processor 1212c through the image signal line ISLc. Thereafter, the image data processed by the sub-image processor 1212b may be directly provided to the image generator 1214, but one of the image data processed by the sub-image processor 1212a and the image data processed by the sub-image processor 1212c may be selected by a select element (e.g., a multiplexer) or the like and then provided to the image generator 1214.

Each of the plurality of sub-image processors 1212a, 1212b, and 1212c may perform image processing, such as bad pixel correction, autofocus correction, auto-white balance, auto-exposure (3A) adjustment, noise reduction, sharpening, gamma control, and remosaic, on image data provided from a corresponding one of the plurality of camera modules 1100a, 1100b, and 1100c.

In some embodiments, remosaic signal processing may be performed by each camera module 1100a, 1100b, or 1100c and then provided to a corresponding sub-image processor 1212a, 1212b, or 1212c.

Image data processed by each sub-image processor 1212a, 1212b, or 1212c may be provided to the image generator 1214. The image generator 1214 may generate an output image by using the image data received from each sub-image processor 1212a, 1212b, or 1212c according to image generating information or a mode signal.

Particularly, the image generator 1214 may generate an output image by merging at least some of pieces of image data generated by the plurality of sub-image processors 1212a, 1212b, and 1212c according to the image generating information or the mode signal. Alternatively, the image generator 1214 may generate an output image by selecting any one of pieces of image data generated by the plurality of sub-image processors 1212a, 1212b, and 1212c according to the image generating information or the mode signal.

In some embodiments, the image generating information may include a zoom signal or a zoom factor. In addition, in some embodiments, the mode signal may be, for example, a signal based on a mode selected by a user.

If the image generating information is a zoom signal (zoom factor), and the plurality of camera modules 1100a, 1100b, and 1100c have different fields of view, the image generator 1214 may perform a different operation according to a type of the zoom signal. For example, if the zoom signal is a first signal, an output image may be generated using image data output from the sub-image processor 1212b and image data output from the sub-image processor 1212a among the image data output from the sub-image processor 1212a and image data output from the sub-image processor 1212c. If the zoom signal is a second signal that is different from the first signal, the image generator 1214 may generate an output image by using image data output from the sub-image processor 1212b and image data output from the sub-image processor 1212c among image data output from the sub-image processor 1212a and the image data output from the sub-image processor 1212c. If the zoom signal is a third signal that is different from the first signal and the second signal, the image generator 1214 may generate an output image by selecting any one of pieces of image data respectively output from the plurality of sub-image processors 1212a, 1212b, and 1212c without performing the image data merge described above. However, embodiments are not limited thereto, and a method of processing image data may be modified and performed according to different circumstances.

Referring to FIG. 13B, in some embodiments, the image processing device 1210 may further include a selector 1213 configured to select one of outputs of the plurality of sub-image processors 1212a, 1212b, and 1212c and provide the selected output to the image generator 1214.

In this case, the selector 1213 may perform a different operation according to a zoom signal or a zoom factor. For example, if the zoom signal is a fourth signal (e.g., if a zoom magnification is a first magnification), the selector 1213 may select one of outputs of the plurality of sub-image processors 1212a, 1212b, and 1212c and provide the selected output to the image generator 1214.

Alternatively, if the zoom signal is a fifth signal that is different from the fourth signal (e.g., if the zoom magnification is a second magnification), the selector 1213 may sequentially provide p (p is a natural number greater than or equal to 2) outputs among outputs of the plurality of sub-image processors 1212a, 1212b, and 1212c to the image generator 1214. For example, the selector 1213 may sequentially provide outputs of the sub-image processor 1212b and the sub-image processor 1212c to the image generator 1214. Alternatively, the selector 1213 may sequentially provide outputs of the sub-image processor 1212a and the sub-image processor 1212b to the image generator 1214. The image generator 1214 may generate one output image by merging the sequentially received p outputs.

Herein, image processing, such as demosaic, down scaling to a video/preview resolution size, gamma correction, and high dynamic range (HDR) processing, may be previously performed by the plurality of sub-image processors 1212a, 1212b, and 1212c, and then the processed image data may be provided to the image generator 1214. Therefore, even when the processed image data is provided to the image generator 1214 by the selector 1213 through a single signal line, an image merge operation of the image generator 1214 may be performed at a high speed.

In some embodiments, the image generator 1214 may receive a plurality of pieces of image data with different exposure times from at least one of the plurality of sub-image processors 1212a, 1212b, and 1212c and generate dynamic range-enhanced merged image data by performing HDR processing on the plurality of pieces of image data.

The camera module controller 1216 may provide a control signal to each of the plurality of camera modules 1100a, 1100b, and 1100c. The control signal generated by the camera module controller 1216 may be provided to corresponding camera modules 1100a, 1100b, and 1100c through control signal lines CSLa, CSLb, and CSLc separated from each other.

Any one (e.g., the camera module 1100b) of the plurality of camera modules 1100a, 1100b, and 1100c may be designated as a master camera according to image generating information including the zoom signal or to a mode signal, and the other camera modules (e.g., the camera modules 1100a and 1100c) may be designated as slave cameras. This information may be included in the control signal and provided to corresponding camera modules 1100a, 1100b, and 1100c through the control signal lines CSLa, CSLb, and CSLc separated from each other.

Camera modules operating as a master and slaves may be changed according to a zoom factor or the mode signal. For example, if a field of view of the camera module 1100a is wider than a field of view of the camera module 1100b, and the zoom factor indicates a low zoom magnification, the camera module 1100a may operate as a master, and the camera module 1100b may operate as a slave. Otherwise, if the zoom factor indicates a high zoom magnification, the camera module 1100b may operate as a master, and the camera module 1100a may operate as a slave.

In some embodiments, the control signal provided from the camera module controller 1216 to each of the plurality of camera modules 1100a, 1100b, and 1100c may include a sync enable signal. For example, if the camera module 1100b is a master camera, and the camera modules 1100a and 1100c are slave cameras, the camera module controller 1216 may send a sync enable signal to the camera module 1100b. The camera module 1100b having received the sync enable signal may generate a sync signal based on the received sync enable signal and provide the generated sync signal to the camera modules 1100a and 1100c through a sync signal line SSL. The camera module 1100b and the camera modules 1100a and 1100c may be synchronized with the sync signal and may transmit image data to the AP 1200.

In some embodiments, the control signal provided from the camera module controller 1216 to the plurality of camera modules 1100a, 1100b, and 1100c may include mode information according to the mode signal. Based on the mode information, the plurality of camera modules 1100a, 1100b, and 1100c may operate in a first operation mode or a second operation mode regarding a sensing rate.

In the first operation mode, the plurality of camera modules 1100a, 1100b, and 1100c may generate an image signal at a first speed (e.g., generate the image signal at a first frame rate), encode the image signal at a second speed higher than the first speed (e.g., encode the image signal at a second frame rate higher than the first frame rate), and send the encoded image signal to the AP 1200. Herein, the second speed may be 30 times higher than (e.g., faster than) the first speed.

The AP 1200 may store the received image signal, i.e., the encoded image signal, in the internal memory 1230 or an external memory 1400 outside the AP 1200, then read the encoded image signal from the internal memory 1230 or the external memory 1400, decode the encoded image signal, and display image data generated based on the decoded image signal. For example, a corresponding sub-image processor among the plurality of sub-image processors 1212a, 1212b, and 1212c of the image processing device 1210 may perform decoding and perform image processing on a decoded image signal.

In the second operation mode, the plurality of camera modules 1100a, 1100b, and 1100c may generate an image signal at a third speed lower than the first speed (e.g., generate the image signal at a third frame rate lower than the first frame rate) and send the image signal to the AP 1200. The image signal provided to the AP 1200 may be a non-encoded signal. The AP 1200 may perform image processing on the received image signal or store the received image signal in the internal memory 1230 or the external memory 1400.

The PMIC 1300 may supply power, e.g., a power source voltage, to each of the plurality of camera modules 1100a, 1100b, and 1100c. For example, under control by the AP 1200, the PMIC 1300 may supply first power to the camera module 1100a through a power signal line PSLa, supply second power to the camera module 1100b through a power signal line PSLb, and supply third power to the camera module 1100c through a power signal line PSLc.

In response to a power control signal PCON from the AP 1200, the PMIC 1300 may generate power corresponding to each of the plurality of camera modules 1100a, 1100b, and 1100c and adjust a level of the power. The power control signal PCON may include a power adjustment signal for each operation mode of the plurality of camera modules 1100a, 1100b, and 1100c. For example, the operation mode may include a low power mode, and in the low power mode, the power control signal PCON may include information about a camera module operating in the low power mode and a set power level. Levels of power respectively provided to the plurality of camera modules 1100a, 1100b, and 1100c may be the same as or different from each other. In addition, the levels of power may be dynamically changed.

As used herein, the terms "comprises", "comprising", "includes", "including", "has", "having" and any other variations thereof specify the presence of the stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

While the inventive concept has been particularly shown and described with reference to example embodiments thereof, it will be understood that various changes in form and details may be made therein without departing from the scope of the following claims.

What is claimed is:

1. An image sensor comprising:
   an interface circuit configured to receive compressed data from an external processor;
   at least one memory configured to store the compressed data; and
   a control logic circuit configured to decompress the compressed data based on an initialized first clock rate,
   wherein, after the control logic circuit decompresses the compressed data, the first clock rate is reset to a second clock rate.

2. The image sensor of claim 1, wherein the compressed data comprises compressed configuration data.

3. The image sensor of claim 2, wherein the control logic circuit comprises:
   a first logic circuit configured to generate first data by decompressing the compressed configuration data; and
   a second logic circuit configured to generate decompressed configuration data by decoding the first data.

4. The image sensor of claim 3, wherein the second logic circuit comprises a first internal memory configured to store the decompressed configuration data.

5. The image sensor of claim 2, wherein the control logic circuit comprises:
   a second internal memory configured to store source code programmed to decompress the compressed configuration data; and
   a first processor configured to perform a decompress operation on the compressed configuration data based on the source code.

6. The image sensor of claim 2, wherein the compressed configuration data comprises first compressed configuration data and second compressed configuration data,
   wherein the interface circuit is further configured to successively receive the first compressed configuration data and the second compressed configuration data,
   wherein the control logic circuit is further configured to successively decompress the first compressed configuration data and the second compressed configuration data, and
   wherein a first operation that comprises the interface circuit receiving the second compressed configuration data overlaps in time with a second operation that comprises the control logic circuit decompressing the first compressed configuration data.

7. The image sensor of claim 2, wherein the compressed configuration data is encrypted based on a key, and
   wherein the control logic circuit is further configured to decrypt the compressed configuration data that was encrypted based on the key and decompress the compressed configuration data that was decrypted.

8. The image sensor of claim 2, wherein the compressed configuration data is encrypted based on a key, and
   wherein the image sensor further comprises a third logic circuit configured to decrypt the compressed configuration data that was encrypted based on the key.

9. The image sensor of claim 1, wherein the first clock rate is greater than or equal to the second clock rate.

10. The image sensor of claim 1, wherein the interface circuit comprises:
    a first interface circuit configured to receive data from the external processor; and
    a second interface circuit configured to send data to the external processor, and
    wherein a data transmission rate of a first communication between the first interface circuit and the external processor is lower than a data transmission rate of a second communication between the second interface circuit and the external processor.

11. An operation method of an image sensor, the method comprising:
    initializing a clock rate of a control logic circuit to a first clock rate;
    receiving compressed configuration data;
    decompressing the compressed configuration data; and
    resetting the first clock rate of the control logic circuit to a second clock rate after decompressing the compressed configuration data.

12. The method of claim 11, wherein the first clock rate is greater than or equal to the second clock rate.

13. The method of claim 11, wherein the compressed configuration data comprises first compressed configuration data and second compressed configuration data,
    wherein the image sensor comprises an interface circuit,
    wherein the receiving the compressed configuration data comprises:
      receiving, by the interface circuit, the first compressed configuration data; and
      receiving, by the interface circuit, the second compressed configuration data,
    wherein the decompressing the compressed configuration data comprises:
      decompressing, by the control logic circuit, the first compressed configuration data; and
      decompressing, by the control logic circuit, the second compressed configuration data, and
    wherein, while the interface circuit receives the second compressed configuration data, the control logic circuit decompresses the first compressed configuration data.

14. The method of claim 11, wherein the compressed configuration data is encrypted based on a key, and
wherein the decompressing the compressed configuration data comprises:
generating decrypted compressed configuration data by decrypting the compressed configuration data that was encrypted based on the key; and
decompressing, by the control logic circuit, the decrypted compressed configuration data.

15. A mobile device comprising:
a processor configured to receive compressed configuration data; and
an image sensor that comprises a control logic circuit configured to receive the compressed configuration data from the processor and configured to decompress the compressed configuration data based on a first clock initialized at a first clock rate,
wherein, after the control logic circuit decompresses the compressed configuration data, the first clock rate of the first clock is reset to a second clock rate.

16. The mobile device of claim 15, wherein the processor is further configured to sequentially send a trigger signal and a command signal to the image sensor after the first clock rate is reset to the second clock rate.

17. The mobile device of claim 15, wherein the first clock rate is greater than or equal to the second clock rate.

18. The mobile device of claim 15, wherein the processor comprises a first interface circuit and a second interface circuit,
wherein the image sensor comprises a third interface circuit and a fourth interface circuit, and
wherein a data transmission rate at which the third interface circuit receives data from the first interface circuit is lower than a data transmission rate at which the second interface circuit receives data from the fourth interface circuit.

19. The mobile device of claim 15, wherein the compressed configuration data comprises first compressed configuration data and second compressed configuration data,
wherein the image sensor further comprises a memory, and
wherein the memory is allocated storage space that is a size of the first compressed configuration data and the second compressed configuration data.

20. The mobile device of claim 15, wherein the compressed configuration data is encrypted based on a key, and
wherein the image sensor further comprises a logic circuit configured to decrypt the compressed configuration data that was encrypted based on the key.

* * * * *